J. R. REYBURN.
CHAIN TIRE GRIP.
APPLICATION FILED MAR. 28, 1918.
1,339,979.
Patented May 11, 1920.
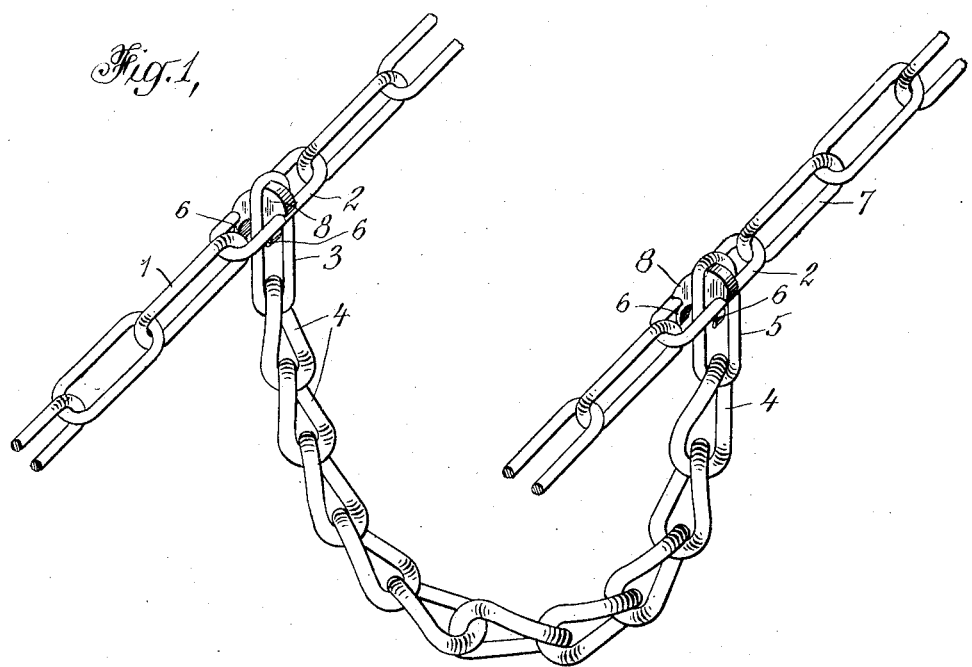
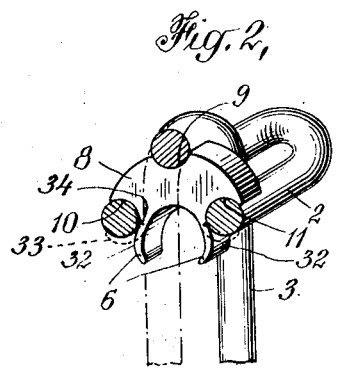
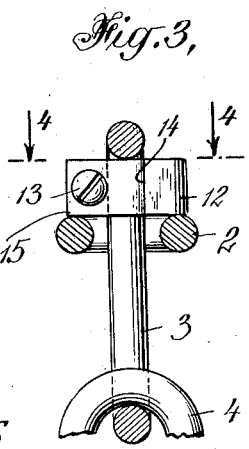
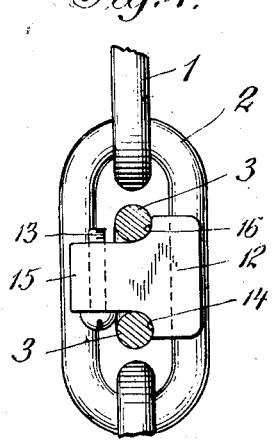
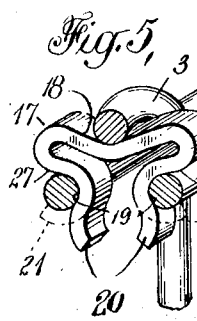
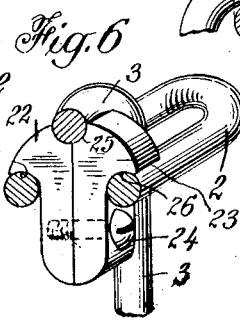
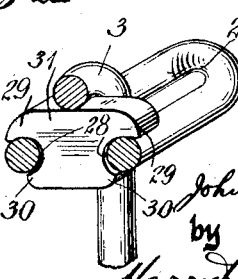

UNITED STATES PATENT OFFICE.

JOHN R. REYBURN, OF FAIRFIELD, CONNECTICUT, ASSIGNOR TO AMERICAN CHAIN COMPANY, INCORPORATED, OF BRIDGEPORT, CONNECTICUT, A CORPORATION OF NEW YORK.

CHAIN TIRE-GRIP.

1,339,979.  Specification of Letters Patent.  Patented May 11, 1920.

Application filed March 28, 1918. Serial No. 225,187.

*To all whom it may concern:*

Be it known that I, JOHN R. REYBURN, a citizen of the United States, and resident of Fairfield, Fairfield county, State of Connecticut, have made a certain new and useful Invention Relating to Chain Tire-Grips, of which the following is a specification, taken in connection with the accompanying drawing, which forms part of the same.

This invention relates especially to tire grips and tread chain connector devices therefor to readily and preferably disengageably connect the tread chains to the side chains of tire grips of the Weed type. The tread chains in which the greatest wear and breakage is experienced preferably have the connecting link at each end of the tread chain inserted through the corresponding holding link in the side chain and held in this interlocked position by a connector device preferably formed with a socket for the end of the connecting link and grippingly or otherwise securely held in position with respect to the side chain link. For some purposes a simple one-piece connector is desirable which may be of block or recurved strip construction, provided with bridging shoulders or portions to engage the side chain link and with tapering or otherwise yielding ends adapted to be bent around the side chain members so as to grippingly engage one or both of the interlocked links. Furthermore, in some cases the yielding ends may be made of malleable iron or such steel stock as only bends to a limited extent or may be formed with nicked or weakened portions so as to break when bent inward to release the connector so that it is practically irreplaceable. In some instances one-piece block retainers may be formed with bridging shoulders and a relatively narrow tongue or projecting portion to extend through one of the interlocked links and be retained in this position by a retaining device, such as a screw having projecting ends or a resilient staple retainer bent or sprung into a retaining recess in the tongue, for example, so as to releasably hold the parts in position.

In the accompanying drawing showing in a somewhat diagrammmatic way illustrative embodiments of the invention, Figure 1 is a perspective view showing the way in which a tread chain may be connected to the side chains.

Fig. 2 is an enlarged detail section of the connector and related parts.

Fig. 3 is an enlarged detail section showing another form of connector and coöperating parts.

Fig. 4 is a horizontal section thereof taken substantially along the line 4—4 of Fig. 3.

Fig. 5 is an enlarged perspective view showing another form of connector, parts being broken away for greater clearness.

Fig. 6 is a similar view showing another form of connector; and

Fig. 7 is a similar view showing still another form of connector.

The side chains 1, 6 of the tire grip are adapted to extend circumferentially around the wheel in the usual way and may be formed or provided with occasional straight links 2 to which the tread chains may be connected. The tread chains may be connected so that the desired number of tread chains are properly spaced around the wheel tire. The tread chains may comprise a greater or less number of curbed traction links 4 adapted to coöperate with the roadway and preferably though not necessarily, straight connecting links of rather unusually long narrow shape, such as 3, 5, may be provided at the ends of the tread chain so as to be inserted through the holding links 2 of the side chains. The connector devices are arranged to grippingly or securely engage one or both of these coöperating interlocked links and hold them in this relation so as to securely connect the tread chain to the side chains. As shown in Figs. 1 and 2, the connector 8 may be of one-piece construction formed of malleable iron, steel or other stock and preferably provided with bridging shoulders 10, 11 to engage one of the holding links, for instance, while it is advantageous in some cases to form the connector with a connecting link socket 9 to accommodate the connecting link, the connector being, if desired, of such width as to fit fairly tightly within the end of the connecting link, so that it may be driven down upon the connector to grippingly engage the same. It is advantageous in some cases to form the connector with projecting more or less resilient ends 6 which may be bent around into gripping engagement with the side members of the holding link opposite the bridging shoulders of the connector.

To facilitate insertion it is sometimes desirable to have these resilient ends bent inward somewhat and when they are provided with retainer portions, such as 32, arranged at a greater distance apart than the ends, retaining sockets, at about the points 34, may thus be provided which engage and more or less retain the sides of the holding links after the connector has been forced into engagement therewith. A still more secure connection can, however, be insured by bending outward the connector ends 6 until they assume approximately the dotted position 33 so that they grippingly engage the holding links, for instance, opposite the bridging shoulders to prevent accidental withdrawal of the connector. It is sometimes desirable to have the connector irreplaceable which prevents its reuse under conditions when it is, for instance, relatively unreliable, and for this purpose, the connector ends may each be formed with one or more nicked or weakened portions 34 preferably on the outside of the same so that the bending of the ends outward into gripping position is thus facilitated while the inward bending of these connector ends to release the connector is apt to break or tear off the ends, especially when they are formed of malleable iron or a relatively low grade of steel having comparatively little ductility.

The connector can, of course grippingly or otherwise engage either of the interlocked holding or connecting links and Figs. 3 and 4 show an arrangement in which a one-piece or block connector is inserted in the connecting link and retained in position therein so that this link is thereafter prevented from being withdrawn from the interlocked holding link. This block connector 12 may be formed with bridging shoulders 14, 16 and with a relatively narrow projecting tongue 15 of such length as to engage the holding link as indicated in Fig. 3. In order to hold the connector in this position any suitable retainer device, such as the retainer screw 13 may be used, the head and projecting end of the screw serving in this instance to positively prevent withdrawal of the connector tongue.

Another form of connector may as shown in Fig. 5 be formed of a recurved strip 17 of steel or other suitable material so bent as to preferably form bridging shoulders 27 to coöperate with the holding link 2 of the side chain while the central portion may be formed with a more or less depressed seat, such as 18, for the connecting link 3. The ends 20 of this connector are preferably more or less resilient and are so formed as to be readily forced through the holding link 2 and then resiliently spring outward with respect to the holding link to a slight extent at least, so that the retaining sockets 19 are brought into coöperation with the holding link. It is also desirable to then bend or force the resilient ends 20 out into the dotted gripping position indicated at 21 so that they have firm and gripping engagement with the holding link.

The Fig. 6 device may be formed of one or more blocks or pieces and as indicated may comprise two parts 22, 23, of thick plate metal or other material of such thickness as to fit conveniently within the connecting link 3. These two parts are formed with bridging shoulders or portions, such as 26, to coöperate with the holding link 2 and their depending central portions passing through this holding link are adapted to be connected as by a connector screw 24 preferably projecting at one or both ends of the device so as to prevent withdrawal as long as the screw remains in place, so that the connector screw thus has an important retaining function, as in the one-piece block connector shown in Figs. 3 and 4. If desired, the connector may be formed with a socket 25 to accommodate the connecting link 3.

A generally similar one-piece connector 31 is shown in Fig. 7 as having bridging shoulders 29 to engage the holding link 2 and preferably having its central portion carried outward below the holding link so as to form the retaining shoulders 30 below the retaining sockets 28 adapted to accommodate the holding link. In the use of this connector the holding links 2 are spread or forced apart sufficiently at their central portions so that the connector may be inserted after the connecting link 3 has been interlocked with the holding link and then the holding link is driven or forced together so as to permanently connect the parts under service conditions.

This invention has been disclosed in connection with a number of illustrative embodiments, forms, proportions, parts, materials, arrangements, methods of manufacture and use, to the details of which disclosure the invention is not of course to be limited, since what is claimed as new and what is desired to be secured by Letters Patent is set forth in the appended claims.

1. The tire grip consisting of side chains comprising holding links and coöperating tread chains having traction links at their central portions and straight sided connecting links at their ends, said connecting links being inserted within the holding links of said side chains and one-piece block connectors within the interlocked portions of said connecting and holding links to prevent their disengagement, said connectors comprising bridging shoulders and coöperating sockets to engage said holding links and comprising connector ends adapted to be bent outward into gripping engagement with said holding links, said connector ends having nicked weakened portions on their outside faces adjacent said sockets to make them substantially irreplaceable.

2. The tire grip consisting of side chains comprising holding links and coöperating tread chains having traction links at their central portions and connecting links at their ends, said connecting links being inserted within the holding links of said side chains and one-piece connectors within the interlocked portions of said connecting and holding links to prevent their disengagement, said connectors comprising bridging shoulders and coöperating sockets to engage said holding links and comprising connector ends adapted to be bent outward into gripping engagement with said holding links.

3. The tire grip consisting of side chains comprising holding links and coöperating tread chains having substantially closed connecting links at their ends, said connecting links being inserted within the holding links of said side chains and one-piece connectors extending through and retained within at least one of said interlocked and holding links to prevent their disengagement, said connectors comprising link sockets to accommodate said links and comprising bridging shoulders and coöperating retaining portions to engage said links and releasably hold said connectors in coöperation therewith, said retaining portions having weakened portions to make them substantially irreplaceable.

4. The tire grip consisting of side chains comprising holding links and coöperating tread chains having substantially closed connecting links at their ends, said connecting links being inserted within the holding links of said side chains and connectors extending through and retained within at least one of said interlocked connecting and holding links to prevent their disengagement, said connectors comprising link sockets to accommodate said links and comprising shoulders and coöperating retaining portions to engage said links and releasably hold said connectors in coöperation therewith.

5. The tire grip consisting of side chains comprising holding links and coöperating tread chains having connecting links at their ends, said connecting links being inserted within the holding links of said side chains and connectors extending through and retained within at least one of said interlocked connecting and holding links to prevent their disengagement, said connectors comprising retaining portions to engage said links and releasably hold said connectors in coöperation therewith.

6. The chain tread member for tire grips comprising central traction portions and terminal straight sided connecting links adapted to be inserted within the holding links of the side chains of such chain grips and one-piece block connectors adapted to be retained within the interlocked portions of said connecting and holding links to prevent their disengagement, said connectors comprising bridging shoulders and coöperating sockets to engage said holding links and comprising resilient connector ends bent toward each other beyond said sockets to facilitate insertion and adapted to be bent outward into gripping engagement with said holding links, said connector ends having weakened portions to make them substantially irreplaceable.

7. The tread member for tire grips comprising central traction portions and terminal straight sided connecting links adapted to be inserted within the holding links of the side members of such grips and one-piece block connectors adapted to be retained within the interlocked portions of said connecting and holding links to prevent their disengagement, said connectors comprising bridging shoulders and coöperating sockets to engage said holding links and comprising connector ends bent toward each other beyond said sockets to facilitate insertion and adapted to be bent outward into gripping engagement with said holding links.

8. The tread member for tire grips comprising central traction portions and terminal connecting links adapted to be inserted within the holding links of the side members of such grips and one-piece connectors adapted to be retained within the interlocked portions of said connecting and holding links to prevent their disengagement, said connectors comprising bridging shoulders and coöperating retaining portions coöperating with such links.

9. The block connector adapted to be retained within and hold the end connecting link of a tread chain in coöperation with the holding link of the side chain of a chain tire grip to prevent disengagement thereof, said connector comprising a connecting link socket to accommodate said connecting link and comprising bridging shoulders and coöperating sockets adapted to engage said holding links and comprising connector ends bent toward each other beyond said sockets to facilitate insertion and adapted to be bent outward into gripping engagement with said holding link.

10. The one piece connector adapted to be retained within and hold the end connecting link of a tread chain in coöperation with the holding link of the side chain of a chain tire grip to prevent disengagement thereof, said connector comprising bridging shoulders to engage one of said links and comprising resilient connector ends bent toward each other to facilitate insertion and adapted to be bent outward into gripping engagement with said link.

11. The connector adapted to be retained within and hold the end connecting link of a tread chain in coöperation with the holding link of the side chain of a chain tire grip to prevent disengagement thereof, said connector comprising bridging shoulders to engage one of said links and comprising a relatively narrow inserting portion to enter said link and retaining means to retain said connector in connecting relation to said link.

12. The connector adapted to hold the end connecting link of a tread chain in coöperation with the holding link of the side chain of a chain tire grip to prevent disengagement thereof, said connector comprising frangible weakened connector ends adapted to extend into gripping retaining engagement with one of said links.

13. The connector adapted to hold the end connecting link of a tread chain in coöperation with the holding link of the side chain of a chain tire grip to prevent disengagement thereof, said connector comprising frangible retaining portions adapted to extend into retaining coöperation with one of said links.

14. The connector adapted to hold the end connecting link of a tread chain in coöperation with the holding link of the side chain of a chain tire grip to prevent disengagement thereof, said connector comprising frangible retaining portions to releasably hold said connector in connecting relation to said links.

15. The one-piece connector adapted to be retained within and hold the end connecting link of a tread chain in coöperation with the holding link of the side chain of a chain tire grip to prevent disengagement thereof, said connector comprising a connecting link socket to accommodate said connecting link and comprising connector ends bent toward each other beyond said sockets to facilitate insertion and adapted to be bent outward into gripping engagement with said holding links, said connector ends having nicked portions on their outside faces to make them substantially irreplaceable.

16. The connector adapted to be retained within and hold the end connecting link of a tread chain in coöperation with the holding link of the side chain of a chain tire grip to prevent disengagement thereof, said connector comprising connector ends adapted to be bent outward into gripping engagement with said holding links, said connector ends having nicked portions on their outside faces to make them substantially irreplaceable.

JOHN R. REYBURN.

Witnesses:
WILLIAM B. SIEGLER,
HAROLD J. HUNT.